United States Patent [19]

Widmar et al.

[11] Patent Number: 4,957,765
[45] Date of Patent: Sep. 18, 1990

[54] CREAM BASED LIQUEURS

[75] Inventors: Craig C. Widmar; Dale Tripp, both of New York, N.Y.; Vincent G. Ficca, Princeton Jct., N.J.

[73] Assignee: Joseph E. Seagram & Sons, Inc., New York, N.Y.

[21] Appl. No.: 119,317

[22] Filed: Nov. 9, 1987

Related U.S. Application Data

[63] Continuation of Ser. No. 945,204, Dec. 22, 1986, abandoned, which is a continuation of Ser. No. 524,191, Aug. 18, 1983, abandoned.

[51] Int. Cl.$^5$ .................. A23C 3/02; A23C 13/12; C12G 3/06; C12H 1/18
[52] U.S. Cl. .................. 426/586; 426/250; 426/592; 426/602; 426/613
[58] Field of Search .............. 426/592, 250, 580, 586, 426/602, 613, 417, 519

[56] References Cited

U.S. PATENT DOCUMENTS 3,843,809 10/1974 Luck ................................ 426/592
4,419,378 12/1983 Rule ................................ 426/592

FOREIGN PATENT DOCUMENTS 0067592 12/1982 European Pat. Off. ............ 426/592
0751900 7/1956 United Kingdom ................ 426/592
2084185 4/1982 United Kingdom ................ 426/592

OTHER PUBLICATIONS

Banks et al., "Formulation of Cream Based Liquers", A Comparison of Sucrose and Sorbitol as the Carbohydrate Component; *J. Soc. Dairy Tech.*, vol. 35, No. 2, Apr. 1982.

*Primary Examiner*—Elizabeth C. Weimar
*Assistant Examiner*—Marian C. Knode
*Attorney, Agent, or Firm*—Kane, Dalsimer, Sullivan, Kurucz, Levy, Eisele and Richard

[57] ABSTRACT

The present invention involves a system and method for preparing cream liqueur products having improved emulsion stability and products thereof. The method comprises the steps of preparing a spirits premix by combining spirits, a carbohydrate, and water, and preferably including flavoring and colorant; preparing a protein premix by dissolving citric acid or a salt thereof and caseinate in water; thoroughly mixing the protein premix with cream, preferably double cream; thereafter preparing a product mixture by mixing the spirit premix with the mixture of cream and the protein premix; and homogenizing the product mixture so that the average particle size is reduced to less than 5 microns, preferably less than 2 microns.

12 Claims, 1 Drawing Sheet

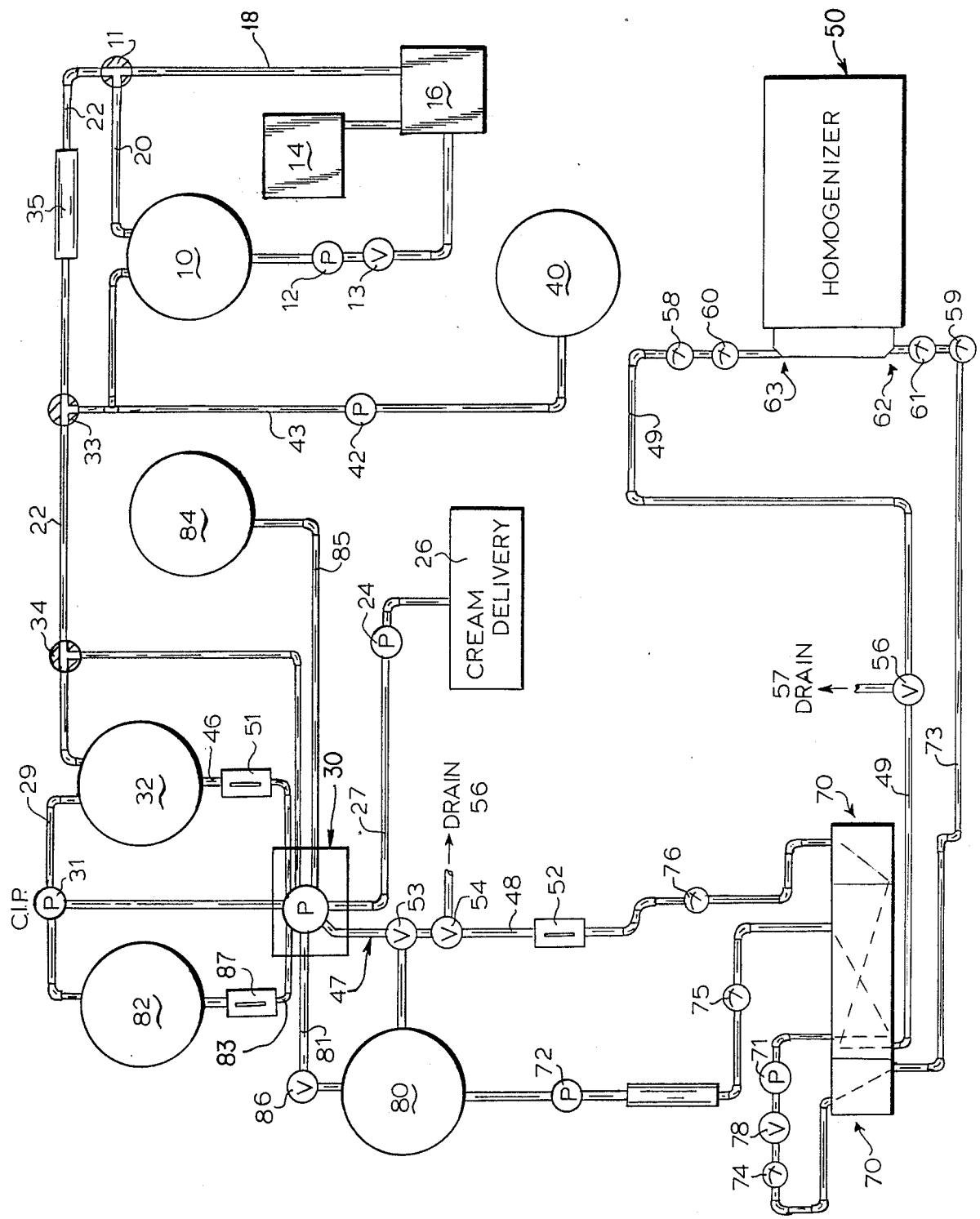

CREAM BASED LIQUEURS

CROSS REFERENCE TO RELATED APPLICATIONS

This application is a continuation of co-pending U.S. Pat. application Ser. No. 945,204 filed Dec. 22, 1986, now abandoned, which in turn is a continuation of U.S. application Ser. No. 524,191 filed Aug. 18, 1983, now abandoned.

FIELD OF THE INVENTION

The present invention relates to processes for preparing aqueous alcohol/cream emulsions, more particularly processes for preparing cream-based liqueurs, and the products thereof.

BACKGROUND OF THE INVENTION

Well known cream liqueur products, such as Baileys Irish Cream, and the like, are basically emulsions formed from mixtures of aqueous alcoholic spirits and cream.

A recurring problem with such products is lack of emulsion stability, i.e., the ability of the two phases of the emulsion to resist change over a period of time and/or stress.

Emulsions may be defined as a mixture of liquids that are immiscible under ordinary conditions and which may separate into layers upon standing, heating, freezing, agitation or the addition of chemicals. Emulsions are basically two-phase systems. The phase which is present in the form of finely divided droplets is called the internal phase; the phase which forms the matrix in which these droplets are suspended is called the external phase. Cream liqueurs are emulsions which have butter oil (from dairy cream) as the internal phase, and a suspension of protein, buffering salts, flavorants and colorants in an alcohol/water mixture as the external phase.

One kind of emulsion instability is "creaming". This mechanism involves the rising of the dispersed (internal) phase to the surface of the emulsion. Factors influencing the rate and degree of "creaming" are the surface electrical charge of the globule, the relative sizes of the globules and the ionic balance of the external phase.

"Creaming" does not involve total breakdown of the emulsion and the layer of risen globules can be re-dispersed into the emulsion by simple agitation. However, repeated re-dispersion of the emulsion's components increases the tendency towards complete phase-separation.

Phase-separation, sometimes called syneresis, results from the coalescence of a few oversized globules, followed by agglomeration of the coalesced globules that are unable to return to the uniformly dispersed state. As these agglomerates become larger they form clumps. Phase-separated cream liqueurs lose their original flavor and texture characteristics and other important properties.

The effects of "creaming" in cream liqueur products, though undesirable, can usually be overcome by shaking or simple agitation. Phase separation, however, is a more serious problem. Phase-separation renders the cream liqueur product unsaleable and unuseable to consumers. Accordingly, emulsion stability is extremely important to the preparation of cream liqueurs having a commercially acceptable shelf-life.

The emulsion stability of cream liqueur products must be sufficient to avoid "creaming" and phase separation under normal handling, transportation, storage and use for such products. Therefore, such products must be stable to vibration, agitation, shaking, high shear, freeze-thaw cycling, elevated temperatures, dilution and, of course, be stable with the other constituents of the product itself such as salts, flavorings, colorants, alcohol, sugars, and the like.

Emulsion stability of cream liqueurs is a result of its composition and its mode of preparation.

It is known that the emulsion stability of cream liqueur products can be improved by adding stabilizing agents such as the sodium and/or potassium salts of citric acid as disclosed in the British Patent Application GB No. 2 084 185 A.

It is also known that, apart from their composition, the preparation of and processing of cream liqueur products, e.g., the mixing order, influences emulsion stability, hence, the shelf life. (Reference: Banks, W. et al. *"Formulation of Cream-based Liqueurs: A Comparison of Sucrose and Sorbitol As The Carbohydrate Component." Journal of the Society of Dairy Technology, Vol. 35,* No. 2, Apr. 1982, pp. 41–43).

SUMMARY OF THE INVENTION

The present invention involves a system and method for the preparation of cream liqueur products having improved emulsion stability and the improved products themselves.

The method comprises the steps of preparing a spirits pre-mix combining spirits, a carbohydrate and water, preferably also including flavorings and colorants; preparing a protein pre-mix by mixing a salt of citric acid and caseinate in water, thoroughly mixing the protein pre-mix with cream, preferably double cream; thereafter, preparing a product mixture by mixing the spirits pre-mix with the mixture of cream and the protein pre-mix; and homogenizing the product mixture as a whole until the resultant globule size is reduced to less than five (5) microns and preferably to less than two (2) microns.

The invention also includes products prepared in accordance with the foregoing method.

BRIEF DESCRIPTION OF THE DRAWING

FIG. 1, is a diagrammatic illustration of a system for the preparation of cream liqueur products in accordance with the present invention.

DESCRIPTION OF THE PREFERRED EMBODIMENT(S)

The spirits pre-mix is an aqueous mixture of spirits, such as, distilled or fermented beverage alcohols including whiskey, rum, sherry, port, neutral spirit, vodka, bourbon, rye, and/or the like; and a carbohydrate preferably sucrose; and may further include one or more of the flavoring(s), such as coffee, chocolate, and vanilla; and/or colorant(s), such as caramel, cochineal, carmine, annatto and/or other approved F.D.&C. dyes.

The protein pre-mix is an aqueous mixture of one-or more alkali metal citrates, such as, sodium and/or potassium salts of citric acid preferably sodium citrate; and a caseinate such as fresh-curd sodium caseinate, preferably alanate-180, available from New Zealand Milk Products, Inc., California, U.S.A..

The concentration of the caseinate required may depend on the butterfat concentration. Preferably there is sufficient caseinate present to coat the surface of the butterfat globules, but not so much as to make the cream liqueur product too thick.

The concentration of the citrate is selected to buffer the product and maintain its pH above 6.60 and below 7.00, preferably between 6.70 and 6.80 pH.

The pH of the product before homogenization is important so as to minimize the effects of dehydration of the caseinate in the product mixture by the alcohol from the spirits pre-mix, and prevent any other changes in the caseinate that might affect its ability to coat the butterfat globules.

Accordingly, the components of the product mixture are selected to maintain the final product within the desired pH range. The spirits pre-mix is not added until after the caseinate is mixed with the cream.

The cream is preferably heavy dairy cream and should have a butterfat content between 38 and 52% and a low titratable acidity.

To prepare a cream liqueur product in accordance with the invention, sodium citrate and sodium caseinate are dissolved in hot water and the resulting mixture is permitted to cool forming the protein pre-mix. The cooled protein pre-mix is added to the cream and sufficiently mixed therewith so as to permit coating of the butterfat globules. A spirit pre-mix is prepared by mixing spirits, carbohydrate, flavoring(s) and colorant(s) in water. The spirits pre-mix is added to the protein premix/cream mixture thus forming the product mixture. The next step is the homogenization of the product mixture. Homogenization is effected by the forcing of a solution of the two immiscible liquids (the aqueous alcohol phase and the butterfat phase) past a spring-seated valve at pressure and temperature relationships so as to reduce the average size of the butterfat globules usually from about 10-25 microns to less than five microns, preferably less than about two microns under a controlled and uniform temperature environment.

Generally, the average globule size cannot be sufficiently reduced by a single pass of the product through a homogenizer. Thus, a double pass, i.e. two passes through a single homogenizer, or one pass, i.e. through two tandemly linked homogenizers, is often used. The most preferable method for homogenization is two-stage homogenization; the first stage at about 4500 psi and the second stage at about 500 psi. It will be appreciated that any means for reducing the average diameter of butterfat globules that does not excessively raise the temperature of the product mixture may be satisfactory for practicing this invention, e.g. ultrasonic techniques.

FIG. 1, diagrammatically illustrates a commercial system for manufacturing cream liqueurs in accordance with the process disclosed herein. In this system the protein premix is prepared in tank 10 by dissolving the citrate salt(s), trisodium citrate, in hot (140° F.) demineralized water and agitating this mixture for about 5 minutes. This citrate solution (buffer) is let stand for about 15 minutes, permitting it to de-aerate and cool slightly. Flow control valve 11 is then positioned to direct liquid flow between conduits 18 and 20, closing off conduit 22, and centrifugal pump 12 is activated to feed the citrate solution to blender 16, e.g. Tri Clover Blender, and sodium caseinate is gravity fed from supply tank 14 to the blender 16 wherein it is mixed with the aqueous citrate solution from tank 10. The flow between pump 12 and the blender 16 is regulated by valve 13. Eventually the entire protein premix of sodium citrate, sodium caseinate and water is collected in tank 10. Some additional agitation to insure complete dissolution (hydration) of the sodium caseinate may be applied at this time. The protein premix is let stand in tank 10 for de-aeration and cooling to about 110° F. Cooling may be accelerated by means of a heat exchanger (not shown) provided in conduits 18 or 22 or any other convenient location. Cooling may also be effected by the addition of selected quantities of cold demineralized water the protein premix itself.

Preferably, while the protein premix is being prepared, fresh heavy cream is pumped from cream holding tank 26 to blend tank 32 by positive displacement pump 24 via conduits 27, 46, and manifold 30. Then, while the cream is slowly agitated, flow control valves 11, 33, and 34 are set to direct protein premix to blend tank 32 via conduit 22 by action of centrifugal pump 12. Filters such as in-line filter 35 may be provided to remove insolubles from the protein premix during transfer to blend tank 32.

Preferably, while the blend tank 32 is being charged with cream and the protein premix is being prepared, the spirits premix is also being prepared in tank 40. Spirits (Rum), sucrose, flavoring, and colorant are thoroughly mixed with water in tank 40 forming the spirits premix. These components are selected to minimize the effect of the spirits premix on the citrate buffered protein/cream system so that the finished product has a pH in the desired range.

Flow control valve 33 is then positioned so that transfer pump 42 can transfer the spirits premix to blend tank 32 via conduits 43 and 22. Blend tank 32 now contains the cream, protein premix, and spirits premix which are mixed thoroughly with agitation to form the product mixture which is the complete product except that the average diameter of butterfat globules therein is about 10-25 microns and the solids content and pH of the product mixture etc. are not yet adjusted to the final product specification.

The product mixture is pumped by the centrifugal pump associated with the manifold 30 via conduit 46 and 81 to the balance tank 80 and regulated by automatic valve 86. The product mixture is pumped from the balance tank 80 by a booster pump 72 and stuffing pump 71 through the Heat Exchanger 70 to two-stage Homogenizer 50. The product mixture flow to the Homogenizer 50 is regulated by a valve 78. Thermometers 58 and 59 and pressure gauges 60 and 61 are provided at the inlet 62 and outlet 63 of the two stage Homogenizer 50 to facilitate monitoring the product mixture. Sight glasses 51, 52 and 87 are provided so that this flow can be observed. Flow control valves 53 and 54 are positioned to direct homogenized product mixture to holding tank 82 via conduits 47 and 83 through manifold 30 or to bottling tank 84 via conduits 47 and 85. In practice the two-stage Homogenizer 50 is brought up to operating temperature(s) and pressure(s) by circulating demineralized water therethrough. Stage one is set at 4500 psi and stage two at 500 psi for a total of 5000 psi. Heat exchanger 70 is set to adjust the temperature of the product mixture going to the two-stage Homogenizer 50 to between 150° F. and 155° F. Homogenization is carried out by passing the product mixture through two-stage Homogenizer 50 so that the temperature of the product mixture does not rise to above 170° F., preferably 168° F., and the average diameter of butterfat globules is reduced to less than 2 microns.

The homogenized product mixture exits two-stage Homogenizer 50 via conduit 49 and re-enters heat exchanger 70 wherein it is cooled to about 68–70° F. (room temperature). Thermometers 74, 75, and 76 are provided for monitoring heat exchanger 70. The product mixture is homogenized twice through a two-stage Homogenizer 50 to insure that the average diameter of butterfat globules is reduced to less than 2 microns. The adjustment of the product mixture normally takes place after the first pass through the homogenizer. After the product mixture has been homogenized twice (double pass homogenization) the finished product may be stored in the holding tank 82 for blending with future batches or to tank 84 for bottling operations by various conduits and valves provided for these purposes as shown in FIG. #1.

It will be appreciated that additional conduits, pumps, valves, thermometers, gauges, filters, sight glasses, mixers, agitators, etc., may be added to the system as necessary or desired and are not shown in FIG. #1 for purposes of clarity.

Cream liqueur products prepared in accordance with the present invention have been shown to have improved emulsion stability including better shelf-life than several comparable commercial cream liqueur products currently on the market. Side by side studies at various temperatures up to 125° F., conducted by applicant, indicated that the viscosity of cream liqueur product prepared in accordance with the present invention does not increase as fast as the tested commercial products especially at higher temperatures. These tests also indicate that phase-separation is less likely in products of this invention and certainly takes longer to occur.

What is claimed is:

1. A method for preparing a cream liqueur having improved emulsion stability, which comprises the steps of:
   (a) admixing alcoholic beverage, a carbohydrate, and water to form an alcoholic beverage premix;
   (b) admixing (i) one or more compounds selected from the group consisting of citric acid and alkali metal salts thereof, (ii) caseinate, and (iii) water to form a protein premix, the amount of citric acid or its salt or salts being sufficient to maintain the pH of the cream liqueur in the range of greater than 6.60 and less than 7.00;
   (c) admixing the protein premix from step (b) with cream having a butterfat content of from about 38 to 52% by weight to form a protein/cream phase in the globules of butterfat are coated with caseinate;
   (d) admixing the alcoholic premix from step (a) with the protein/cream phase of step (c) to form an emulsion of butterfat globules coated with caseinate in an aqueous alcohol phase; and
   (e) treating the emulsion from step (d) to reduce the average diameter of the butterfat globules to less than about 5 microns.

2. The method of claim 1, wherein in step (c) the average diameter of the butterfat globules is reduced to less than about 2 microns.

3. The method of claim 1, wherein in step (e) the emulsion is homogenized to reduce the average diameter of the butterfat globules.

4. The method of claim 3, wherein the homogenization is a two-stage procedure, the first stage being conducted at a pressure higher than that at which the second stage is conducted.

5. The method of claim 4, wherein the first stage is conducted at a pressure of about 4500 psi, the second stage is conducted at a pressure of about 500 psi, and the temperature of the product mixture is not permitted to exceed 170° F.

6. The method of claim 1, wherein in step (a) the carbohydrate is at least one compound selected from the group consisting of sucrose, glucose, and sorbitol and the admixture also includes flavoring and colorant, and in step (b) sodium citrate, sodium caseinate, and water are admixed.

7. The method of claim 6, wherein the sodium caseinate is fresh curd sodium caseinate.

8. The method of claim 1, wherein the premix in step (a) also comprises one or more flavorings.

9. The method of claim 1, wherein the premix in step (a) also comprises one or more colorants.

10. The method of claim 1, wherein in step (a) the carbohydrate is selected from the group consisting of sucrose, glucose, and sorbitol; in step (b) sodium citrate, fresh-curd sodium caseinate, and water are admixed; and in step (c) the cream is double cream.

11. The method of claim 1, wherein in step (b) the amount of citric acid or its salt or salts is sufficient to maintain the pH of the cream liqueur in the range of from about 6.70 to 6.80.

12. A cream liqueur having improved emulsion stability prepared according to claim 1.

* * * * *